United States Patent [19]

Jacobson et al.

[11] Patent Number: 4,500,232
[45] Date of Patent: Feb. 19, 1985

[54] BORING BAR

[75] Inventors: Mark K. Jacobson; Stanley C. Belttari, both of West Bloomfield, Mich.

[73] Assignee: Boremaster Precision Tool & Mfg., Windsor, Canada

[21] Appl. No.: 359,158

[22] Filed: Mar. 17, 1982

[51] Int. Cl.³ .............................................. B23B 29/02
[52] U.S. Cl. .................................... 408/153; 408/185
[58] Field of Search ............... 408/181, 185, 153, 154; 279/62, 1 TS, 56

[56] References Cited

U.S. PATENT DOCUMENTS

| | | | |
|---|---|---|---|
| 2,359,957 | 10/1944 | Zempel | 408/181 |
| 2,775,149 | 12/1956 | Thomas | 408/185 |
| 2,893,743 | 7/1959 | Onoleck | 279/56 X |
| 3,262,184 | 7/1966 | Sweeny | 408/153X |
| 3,309,946 | 3/1967 | Thomas | 408/153 |
| 3,313,187 | 4/1967 | Benjamin et al | 408/153 |
| 3,338,117 | 8/1967 | De Vlieg et al | 408/153 |
| 3,434,376 | 3/1969 | Benjamin et al | 408/153 |
| 3,697,187 | 10/1972 | Faber et al. | 408/154 |
| 3,929,343 | 12/1975 | Wanner et al. | 279/62 X |
| 3,937,587 | 2/1976 | Lindem et al | 408/181 |
| 4,063,842 | 12/1977 | Barkley et al | 408/146 |
| 4,396,319 | 8/1983 | Miles | 408/154 X |
| 4,412,767 | 11/1983 | Schmid et al. | 409/234 |

Primary Examiner—Z. R. Bilinsky
Attorney, Agent, or Firm—Gifford, VanOphem, Sheridan, Sprinkle & Nabozny

[57] ABSTRACT

A unique boring bar is disclosed which comprises a body having a generally radially extending formed through it at one end. A slide member is axially slidably positioned within the body throughbore and a standard cutting tool is secured to the slide member. In addition, one end of the slide member is externally threaded and threadably cooperates with an annular dial. The dial is locked against axial movement with respect to the body so that rotation of the dial axially displaces the slide member with its attached cutting tool.

8 Claims, 9 Drawing Figures

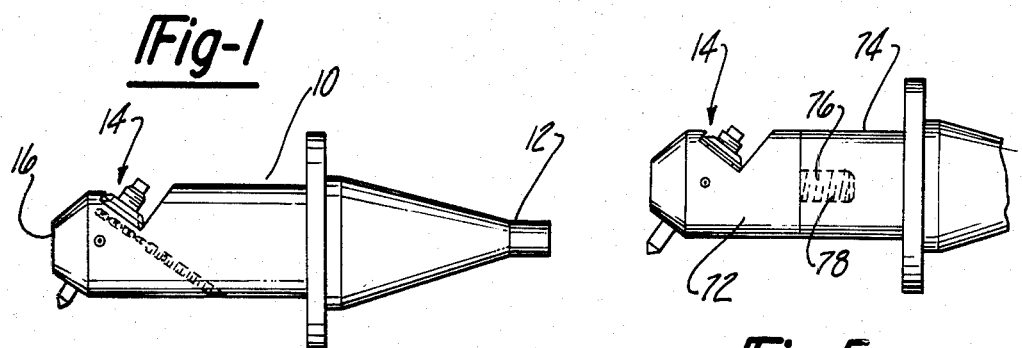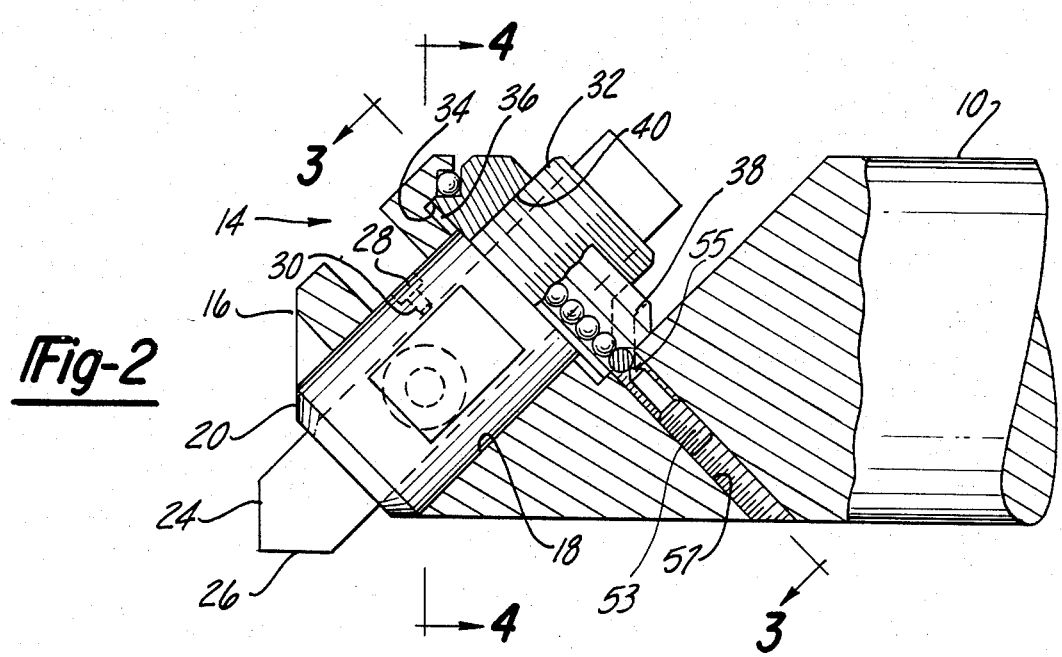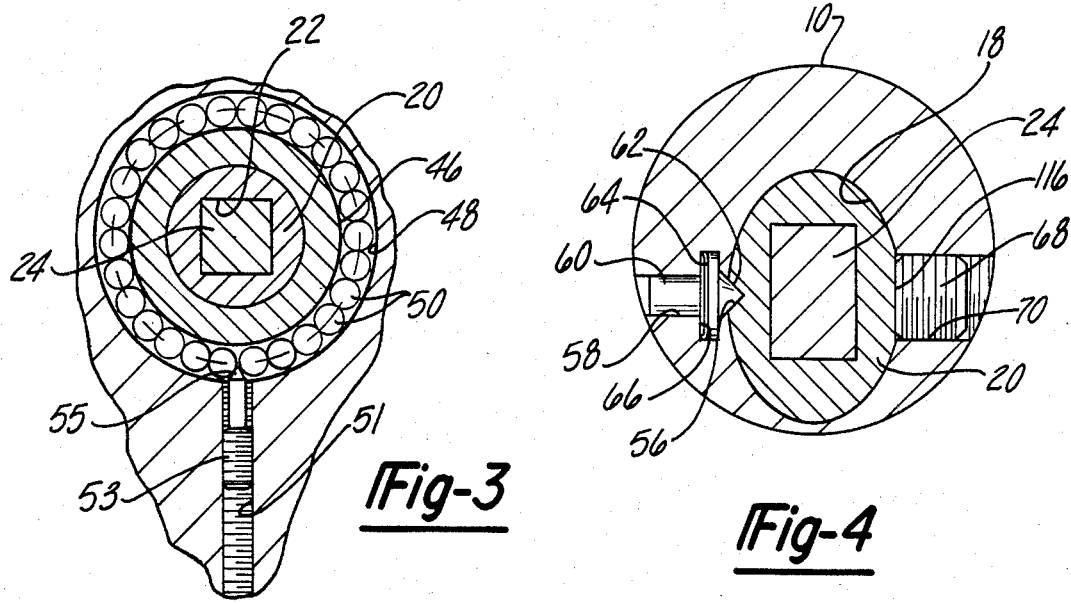

BORING BAR

BACKGROUND OF THE INVENTION

I. Field of the Invention

The present invention relates generally to boring bars and, more particularly, to a boring bar in which the radial position of the cutting tool is adjustable.

II. Description of the Prior Art

There are a number of previously known boring bars and these boring bars are used in a plurality of different applications. In general, however, each boring bar includes an elongated body having one end adapted to be positioned within and held by a tool holder or chuck of a rotary drive machine. Thus, upon rotation of the machine, the boring bar body is rotatably driven about the axis.

A cutting tool or tool insert in turn is attached to the opposite end of the body of the boring bar. The cutting tool extends generally radially away from the axis of the boring bar body and has a cutting edge which performs the cutting operation on the work during a boring operation. In addition, there have been a number of previously known boring bars in which the radial position of the tool with respect to the longitudinal axis of the boring bar is adjustable which correspondingly varies the diameter of the hole which is bored. These previously known boring bars, however, all suffer from a number of common disadvantages.

One disadvantage of these previously known boring bars is that the cutting tool or tool insert must be specially fabricated for the particularly boring bar. Thus, a boring bar constructed by one manufacturer will only accept cutting tools or tool inserts purchased from one, and usually the same, manufacturer. Moreover, these cutting tools and tool inserts are very expensive and expense of the cutting tools and tool inserts is further aggrevated since the required tool or insert is available from only a single source.

A still further disadvantage of these previously known boring bars is that the mechanism for adjusting the radial position of the cutting tool have not been wholly satisfactory in use. One problem of these previously known adjustable boring bars is that the cutting tool can only be accurately adjusted to within a thousand of an inch, more or less, of the desired diameter to be bored. In many high precision boring operations, however, a boring accuracy to within a ten thousand of an inch, more or less, is required. In order to obtain such high precision, special boring bars must then be used.

A still further disadvantage of these previously known boring bars is that the range diameters which a single boring bar can cut is also very limited, oftentimes to within a fraction of an inch. Thus, in order to be able to bore holes of fixed diameters over a relatively wide range, for example, several inches, it has been heretofore necessary for machine shops and the like to maintain a plurality of different boring bars in stock wherein each boring bar is capable of boring holes in a different diameter range. This solution, however, is undesirable in view of the high cost of both the boring bar and their cutting tools or tool inserts.

SUMMARY OF THE PRESENT INVENTION

The present invention overcomes all of the above mentioned disadvantages of the previously known boring bars by providing an improved boring bar capable of accepting a standard cutting tool and in which the radial position of the cutting tool with respect to the axis of the boring bar is accurately adjustable over a wide range.

In brief, the boring bar according to the present invention comprises an elongated body having one end adapted to be received within a tool holder or chuck of a rotary driven machine. Conversely, a transversely extending throughbore is formed at the opposite end of the boring bar body.

A cylindrical slide member is axially slidably positioned within the throughbore and includes means for locking a standard cutting tool to the slide member. In one form of the invention, the slide member includes the square bore formed axially through it and which receives a standard square cutting tool. The cutting tool is locked within the square bore by set screws or the like.

In a second embodiment of the invention, a standard triangular cutting tool is secured within a receiving recess formed at one end of the slide member. Preferably, the triangular tool is secured to the slide member by an eccentric set screw although other means can altenatively be used.

One end of the slide member is externally threaded while an annular and internally threaded dial threadably engages this portion of the slide member. A bearing assembly locks the dial against axial movement with respect to the boring bar body so that rotation of the dial radially displaces the slide member with its attached cutting tool with respect to the axis of the boring bar. When adjusted as desired, a set screw extending through the body of the boring bar and against the side member is tightened to lock the slide member in its adjusted position.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a side view illustrating a first preferred embodiment of the boring bar of the present invention;

FIG. 2 is a fragmentary longitudinal sectional view illustrating the first preferred embodiment of the invention;

FIG. 3 is a sectional view taken substantially along line 3—3 in FIG. 2;

FIG. 4 is a sectional view taken substantially along line 4—4 in FIG. 2;

FIG. 5 is a side view similar to FIG. 1 but showing a modification thereof;

DETAILED DESCRIPTION OF A PREFERRED EMBODIMENT OF THE PRESENT INVENTION

Figure 6:
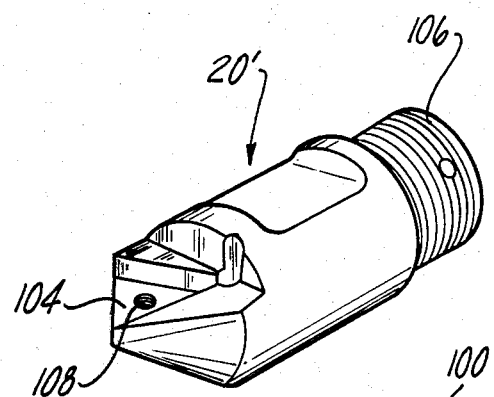
FIG. 6 is a perspective view illustrating a second preferred embodiment of the present invention.

With reference first to FIGS. 1-4, a first preferred embodiment of the boring bar of the present invention is thereshown and includes an elongated body 10 having one end 12 adapted to be received within a tool holder or chuck of a rotary drive machine (not shown) which, upon activation, rotatably drives the boring bar about its longitudinal axis. A cutting tool assembly 14 is mounted in a manner to be subsequently described in greater detail in the opposite end 16 of the boring bar body 10. Moreover, it is the cutting tool assembly 14 and its mounting to the boring bar which forms the novelty of the instant invention.

With reference now particularly to FIGS. 2-4, the cutting tool assembly 14 is thereshown in greater detail and includes a transverse bore 18 which is formed through the end 16 of the boring bar body 10. A generally cylindrical slide member 20 is axially slidably positioned within this bore 18. As best shown in FIG. 3, the slide member 20 includes a axial throughbore 22 having a square cross sectional shape and is dimensioned to slidably receive a standard square cutting tool 24 therein. As is well known in the art, the square cutting tool 24 has a cutting edge 26 (FIG. 2) and is available in the number of standard sizes and types. Such cutting tools 24 can be readily obtained at relatively low cost.

Referring now particularly to, at least one and preferably two set screws 28 threadably engage receiving bores 30 in the slide member 20. These bores are open to the square bore 52 and, upon tightening, lock the cutting tool to the slide member 20. Thus, the cutting tool 24 can be adjusted to any longitudinal position within the slide member 20, and in doing so, vary the regular distance between the cutting edge 26 and the boring bar axis. When adjusted to the desired position, the tool 24 is locked in place by tightening the set screws 28. This adjustment, while not precise, nevertheless provides a great range of cutting tool diameters which can be formed by the boring bar since the standard cutting tools 24 are readily available in long lengths, for example, more than five inches, as well as shorter lengths.

With reference now particularly to FIG. 2, the slide member 20 includes an externally threaded portion 32 at its inner end while the boring bar throughbore 18 includes an enlarged diameter portion 34 at its inner end thus forming an annular abutment surface 36. An annular dial 38 is internally threaded at 40 and threadably engages the threaded portion 32 of the slide member 20. The annular dial 38 has an outside diameter substantially the same as the enlarged diameter portion 34 of the throughbore 18 so that the dial member 38 can be nested within the enlarged diameter portion 34 and against the abutment surface 36.

A V-shaped groove is formed around the outer periphery of the dial 38 and registers with a second V-shaped groove in the boring bar body 10. These V-shaped grooves together form a ball bearing race. A plurality of ball bearings 50 are then positioned within this channel through an access hole 51 (FIGS. 2 and 3) and thus lock the dial 38 against axial movement.

After the ball bearings are loaded into the ball bearing race through the axis hole 51, an allen set screw 53 having a pointed end 55 is threadably secured within the access hole 51 so that the pointed end 55 is positioned in between two ball bearings 50. Upon tightening of the set screw 53, the pointed end 55 of the set screw 53 spreads apart the two ball bearings 50 which the pointed end 55 contacts and circumferentially compresses all of the ball bearings 50 within the ball bearing race. This compression is sufficient to prevent rotation of the ball bearings 50 despite rotation of the dial 38. Instead, the rotation of the dial 38 merely causes the ball bearings 50 to slide, rather than rotate, within the ball bearing race. Consequently, the dial 38 will not become jammed in the event of the small amount of dirt or debris within the ball bearing race. Furthermore, any play between the dial 38 and the body 10, as might be caused of long usage of the boring bar, can be totally eliminated by merely tightening the allen set screw 73.

With reference now particularly to FIG. 4, an axially extending V-shaped groove 56 is formed along one side of the slide member 20. A transverse hole 58 is then formed within the boring bar body 10 which registers with this V-shaped groove 56 while a pin 60 having an enlarged V-shaped head 62 is positioned within this bore so that the head 62 is received within the V-shaped groove 56. A resilient member 64, such as O ring, is sandwiched in between the enlarged head 62 of the pin 60 and an annular abutment surface 66 formed in the boring bar body 10. This resilient member 64 is in a state of compression thus urging the pointed end 62 into the groove 56.

The coaction between the pin 60 and the V-shaped groove 56 prevents the rotation of the slide member 20 within the boring bar transverse bore 18 as is slide member 20 is axially moved by the rotation of the dial 38. When the slide member 20 is adjusted to its desired position, a locking set screw 68, which is threadably secured within a transverse bore 70 diametrically opposed from the pin 60, is tightened against a flat 116 on the slide member 20 which locks the slide member 20 against further movement with respect to the boring bar 10.

The resilient member 64 maintains a steady pressure on the slide member 20 as the locking set screw 68 is loosened. This constant pressure prevents movement of the slide member 20 as the locking set screw 68 is loosened. Consequently, the locking screw 68 can be loosened without upsetting the adjusted position of the slide member 20.

With reference now particularly to FIG. 5, a modification of the invention is thereshown in which the boring bar 10 is constructed from two separate parts 72 and 74. The boring bar part 72 includes an outwardly extending threaded shank 76 which threadably engages a receiving threaded bore 78 to lock the boring bar part 72 and 74 together. Construction of the boring bar in two different parts 72 and 74 as shown in FIG. 5, reduces the inventory cost for manufacturing the boring bars since the boring bar part 72 can be easily and rapidly screwed onto the second boring bar part 74 only when the boring bar is ready for shipment.

With reference now to FIGS. 6-9, a modified slide member 20' is thereshown which, as desired, can be substituted for the slide member 20 illustrated in FIG. 1-5. The slide member 20' is designed for receiving a standard triangular cutting tool 100 rather than the square cutting tool shown in FIGS. 1-5.

The slide member 20' includes a generally cylindrical body portion 102 having a triangular recess 104 formed at one end. The slide member 20' is externally threaded at its other end 106 and this threaded end 106 is adapted to threadably engage the dial 38.

The triangular shaped recess 104 includes a threaded hole 108 at a midpoint which registers with a circular hole 110 formed in a conventional triangular cutting tool 100. In the preferred form of the invention, an allen set screw 112 (FIG. 8) having an eccentric end 114 is threadably mounted within the bore 108. The eccentric end 114 is positioned through the cutting tool hole 110 so that, upon rotation of the set screw 112, the eccentric end 114 frictionally engages the cutting tool 100 and pulls the cutting tool 100 both downwardly against the triangular recess 104 and against the sides of the recess 104 thus locking the tool 100 to the slide member 20'. Other means, such as a simple screw, can be used to secure the cutting tool 100 to the slide 20'.

Figure 7:
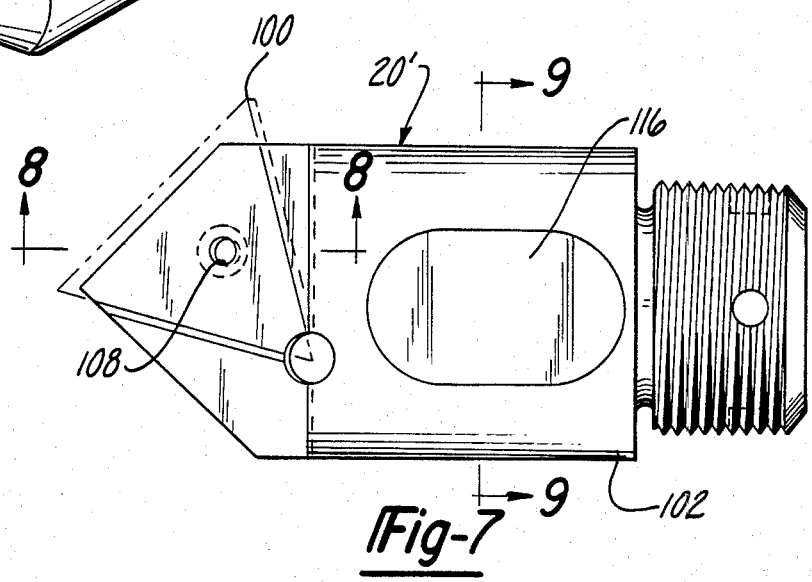
FIG. 7 is a side view of the embodiment illustrated in FIG. 6.
Figure 8:
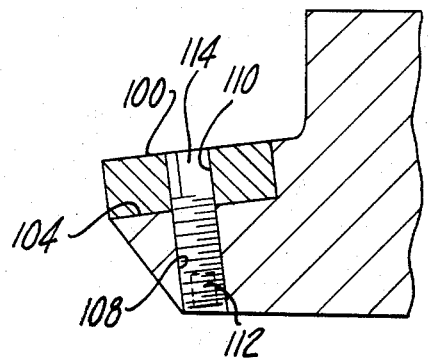
FIG. 8 is a sectional view taken substantially along line 8—8 in FIG. 7.
Figure 9:
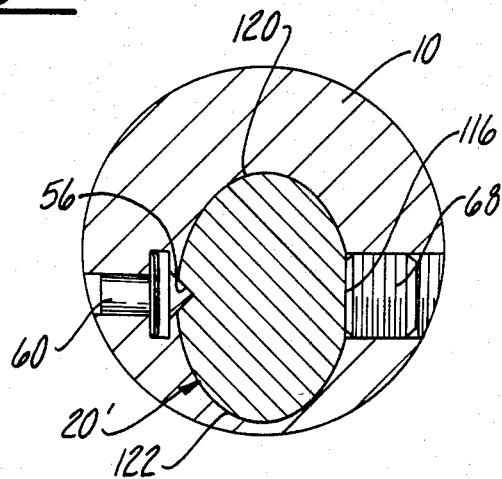
FIG. 9 is a sectional view taken substantially along line 9—9 in FIG. 7.

With reference now particularly to FIGS. 7 and 9, an antirotation groove 56' is formed along one side of the slide member 20' and cooperates with the pin 60 to prevent rotation of the slide member 20' with respect to the boring bar body 10. Similarly, a flat 116' is formed on the opposite side of the slide member 20' and the locking screw 68 abuts against this flat 116 to lock the slide member 20' to the boring bar body 10 at its adjusted position.

Unlike the previously described slide 20 in FIGS. 1-5, the slide 20' is relieved for approximately 160° along its side opposite from its flat 116, i.e., between points 120 and 122 (FIG. 9). This relief, which is only a few thousandths of an inch, ensures that the slide member 20' contacts the boring bar 10 at three triangularly positioned locations, namely the points 120 and 122 as well as the engagement between the locking screw 68 and the flat 116'. Such a three point engagement between the boring bar and the like 20' eliminates all play between the slide 20' and the boring bar body 10 upon tightening of the locking screw 68.

Whenever it is desired to use a triangular cutting tool rather than a square cutting tool, the slide member 20 (FIGS. 1-5) is simply removed from the boring bar body 10 by loosening the locking screws 68 and rotating the dial 38 until the dial 38 separates from the slide member 20. The slide member 20 is then slid out of the boring bar bore 18 and the slide member 20' inserted in its place. The dial 38 is again rotated thus engaging the threaded end 106 of the slide member 20' and securing the slide member 20' to the boring bar 10 in the desired fashion.

In operation, with the cutting tool 24 or 100 secured to the slide member 20 or 20', respectively, the locking screw 68 is loosened and the dial 38 is rotated thus moving the slide member 20 or 20' with its attached cutting tool to the desired radialy position with respect to the access of the boring bar. When the proper position has been reached, the locking screw 68 is tightened which locks the slide member 20 or 20' to the boring bar at its adjusted position.

It will be understood, of course, that the desired precision obtainable by the boring bar can be increased by merely utilizing finer threads between the dial 38 and the threaded portion of the slide member. In practice, the boring bar according to the present invention is capable of achieving precision within a few ten thousandths of an inch.

Having described our invention, however, many modifications thereto will become apparent to those skilled in the art to which it pertains without deviation from the spirit of the invention as defined by the scope of the appended claims.

We claim:

1. A boring bar comprising:
   a body having a transverse throughbore at one end, said throughbore having a first end and a second end,
   a slide member axially slidably positioned within said throughbore,
   means for locking a cutting tool having at least one cutting edge to said slide member so that said at least one cutting edge extends outwardly from one end of said slide member at said first end of said throughbore,
   said body having a cylindrical recess formed concentrically around said second end of said throughbore,
   means for axially adjustably positioning said slide member in said body throughbore,
   wherein said slide member includes an externally threaded portion at the other end of said slide member and wherein said axial adjustment means further comprises an internally threaded annular dial positioned within said cylindrical recess which threadably engages the slide member threaded portion, and means for locking said dial to said body against axial movement,
   wherein said dial includes an annular groove formed about its outer periphery which registers with a groove in the cylindrical recess of said body thus forming an annular channel therebetween and wherein said locking means further comprises a plurality of ball bearings positioned within said channel, and
   means for locking said ball bearings against rotation while permitting said dial to rotate with respect to said body.

2. The invention as defined in claim 1 wherein said ball bearing locking means further comprises means insertable between two ball bearings for spreading said two ball bearings apart.

3. The invention as defined in claim 1 and further comprising means for locking said slide member to said body at an adjusted position.

4. The invention as defined in claim 3 wherein said slide member locking means comprises a threaded member threadably mounted in a receiving bore in said body, said receiving bore transversely intersection said body throughbore.

5. The invention as defined in claim 4 and further comprising means for resiliently urging said slide member against said threaded member.

6. The invention as defined in claim 4 wherein said slide member includes a circumferentially relieved portion along its side opposite from the side of the slide member which abuts against said threaded member.

7. The invention as defined in claim 1 wherein said slide member includes a square bore formed axially therethrough and adapted to receive a standard square cutting tool therein.

8. A boring bar comprising:
   a body having a transverse throughbore at one end said throughbore having a first end and a second end,
   a slide member axially slidably positioned within said thorughbore,
   means for locking a cutting tool having at least one cutting edge to said slide member so that said at least one cutting edge extends outwardly from one end of said slide member at said first end of said throughbore,
   said body having a cylindrical recess formed concentrically around said second end of said throughbore,
   means for axially adjustably positioning said slide member in said body throughbore,
   wherein said slide member includes an externally threaded portion at the other end of said slide member and wherein said axial adjustment means further comprises an internally threaded annular dial positioned within said cylindrical recess which threadably engages the slide member threaded portion, and means for locking said dial to said body against axial movement, and wherein said dial includes an annular groove formed about its outer periphery which registers with a groove in the cylindricall recess of said body thus forming an annular channel therebetween and wherein said locking means further comprises a plurality of ball bearings positioned within said channel.

* * * * *

UNITED STATES PATENT AND TRADEMARK OFFICE
CERTIFICATE OF CORRECTION

PATENT NO. : 4,500,232
DATED : February 19, 1985
INVENTOR(S) : Jacobson et al

It is certified that error appears in the above—identified patent and that said Letters Patent is hereby corrected as shown below:

Column 6, line 54 delete "thorughbore" insert --throughbore--.

Column 8, line 1 delete "cylindricall" insert --cylindrical--.

Signed and Sealed this

Twenty-fifth Day of June 1985

[SEAL]

Attest:

DONALD J. QUIGG

Attesting Officer

Acting Commissioner of Patents and Trademarks